United States Patent Office 2,838,644
Patented June 10, 1958

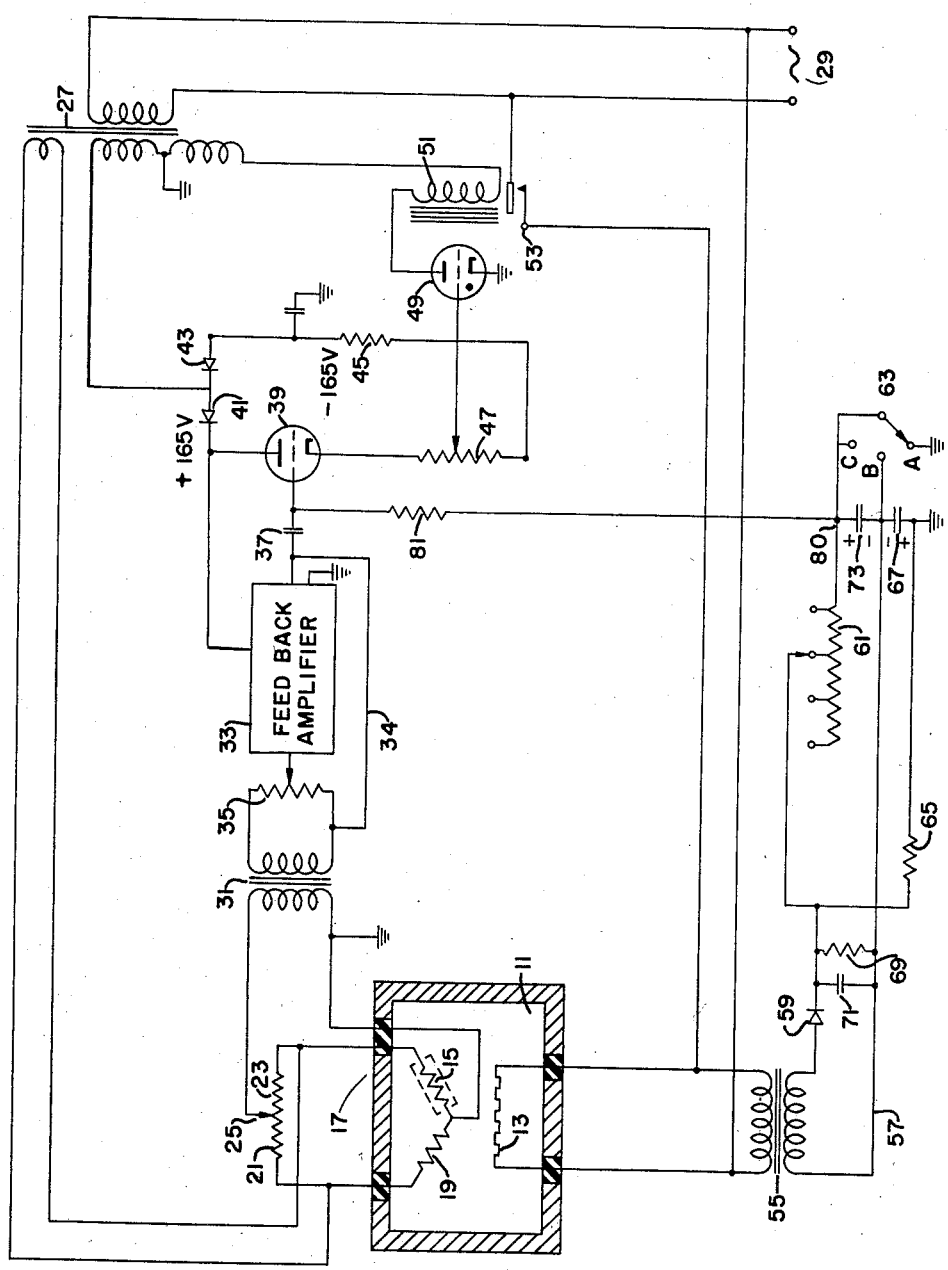
INVENTORS
F. B. ROLFSON
W. B. MILLIGAN
THEIR ATTORNEY

2,838,644
ELECTRONIC THERMOREGULATOR

Francis B. Rolfson, San Pablo, and William B. Milligan, El Cerrito, Calif., assignors to Shell Development Company, New York, N. Y., a corporation of Delaware Application January 20, 1956, Serial No. 560,434

4 Claims. (Cl. 219—20)

This invention relates to thermoregulator systems and pertains more particularly to a thermoregulator control comprising an electronic circuit whereby the temperature of the controlled zone is maintained at a constant value and is stabilized against variations due to changes in temperature or heat demand on said zone occurring when said system is operated at a steady state.

Conventional thermoregulators, and particularly those of the intermittent or on-and-off type can, under certain conditions, maintain the temperature of a given zone, for example, a liquid bath, at a controlled value which is very close to that desired. However, if said conditions, for example, the ambient temperature and/or the heat demand on the controlled zone, change from one value to another, the temperature of said zone undergoes a corresponding permanent change offset or so-called droop to a value which is different from that for which the system had been set. The same is generally true of thermostats of the proportional control type.

It is therefore an object of this invention to provide a thermoregulator system having a reset control action whereby the system is maintained at a desired set temperature, or is automatically caused to revert to said temperature if temporarily pulled therefrom by abrupt changes in the heat demand and/or temperature of the controlled zone.

Since, moreover, both on-and-off and proportional type operations are in many cases quite satisfactory and have desirable features, it is also an object of this invention to provide a thermoregulator system which can be selectively operated as an on-and-off, a proportional, or a proportional-with-reset type control system.

It is also an object of this invention to provide a system of the type described above, said system being controlled and maintained at the desired pre-set temperature by electronic circuit means.

These and other objects of this invention will be understood from the following description taken with reference to the drawing, the single feature whereof shows a simplified circuit diagram of the present thermoregulator system.

For the purposes of the present specification, the system of this invention will be described as a thermoregulator used to control the temperature of a liquid bath, it being obvious that said system is susceptible of many other applications readily understood by those skilled in the art.

Referring to the drawing, numeral 11 indicates a thermally insulated liquid bath to which heat is supplied by means of an immersion type heater 13. The temperature sensing element is a conventional resistance thermometer 15, forming one of the arms of a measuring bridge 17. The other arms of the bridge are formed by a resistance 19, immersed in the bath together with the resistance thermometer 15, and variable resistances 21 and 23, preferably forming part of a continuous resistor provided with a slide contact 25.

The input to the bridge 17 is supplied from a multi-winding transformer 27, whose primary is energized by an A. C. power line having terminals 29. The output of the bridge 17 is delivered by means of a high-gain shielded transformer 31 to a feedback amplifier 33, the input to said amplifier being regulated by a variable gain control 35. A large amount of negative feedback is preferably maintained around the amplifier 33, by means indicated at 34, to obtain stable gain with relative freedom from variations due to vacuum tube characteristics.

The output of the feedback amplifier 33 is applied, through a capacitor 37, to the grid of a cathode follower amplifier 39. The cathode return of amplifier 39 is maintained at a relatively high negative potential, such for example as 165 volts by means comprising the multi-winding transformer 27, rectifiers (such for example as selenium rectifiers), 41 and 43 and resistance 45. The cathode potential of amplifier 39 is applied, through a slide controlled resistance 47, to the grid of a thyratron tube 49. When the thyratron 49 fires, the plate current flowing through the solenoid winding 51 closes the relay 53 and thus connects the heater 13 to the power potentials 29.

The cathode follower circuit performs two functions. First, as stated above, the cathode return of tube 39 is maintained at a high negative voltage, such as 165 volts. This voltage appears also at the grid of the thyratron tube 49, and effectively prevents anode conduction of the thyratron during the time required for the warm-up period, such as 10 seconds. This eliminates the necessity of providing a time-delay relay to protect the thyratron during said period. Second, the cathode follower circuit operates to provide isolation between the grid of tube 39 and that of the thyratron tube 49. Since tubes 39 and 49 are direct-coupled, any potential at the grid of tube 39 appears at that of tube 49 decreased by a value such as 2 volts which is due to the effect of the resistance 47. This provides a suitable negative bias for the thyratron tube 49.

Connected through a transformer 55 to the heater 13, and energized together therewith from the terminals 29, is a selector circuit generally shown at 57, having a rectifier 59, a variable resistance 61 and a switch 63 connected in series in one branch thereof, and a resistance 65 and a capacitor 67 connected in series in a second branch. A resistance 69 and capacitor 71 are connected in parallel across the circuit 57 and serve as a filter. A capacitor 73 is connected across the first branch and in series with capacitor 67, said capacitors 67 and 73 serving as control capacitors, as will appear hereinbelow.

The switch 63 of the selector circuit 57 has three positions corresponding to contacts marked A, B and C. When the switch is on contact A, the system operates as an on-and-off controller. When it is on contact B, the system operates as a proportional type controller. When it is on contact C, the system operates as a proportional controller with reset functions.

The operation of the system will be understood from the following brief description in which it will be assumed that an alternating voltage signal at the grid of the cathode follower tube 39 from the bridge 17 resulting from a bath temperature lower than that for which the system has been set and at which the bridge 17 is in balance will be considered a positive error signal when it is in phase with the voltage applied to the anode of thyratron 49 from the transformer 27, that is, when said error signal is applied to said thyratron in such phase relationship as to cause the thyratron to fire.

A. *On-and-off operation*

With the switch 63 on contact A, the junction point 80 at which the selector circuit is connected to the grid return of the cathode follower tube 39, is at ground or zero potential. When a positive alternating current error signal, indicating a temperature below set point, is applied from the bridge 17 to the grid tube 39, the cathode of said tube follows this voltage, which is applied with a decrease in value of about 2 volts due to the resistance 47 to the grid of the thyratron 49. This causes the thyratron to fire, and its plate current energizes the winding 51 and closes the relay 53, thus supplying electrical energy to the heater 13. As the heat which is thus supplied brings the bath 11 to the set point of the desired temperature, the positive error signal from the bridge 17 is gradually reduced to zero, the thyratron 49 stopping to fire as soon as its grid becomes sufficiently negative. This opens the relay 53 and de-energizes the heater 55, whereupon the cycle of operations is repeated.

It should however be borne in mind that in actual apparatus there are time lags in the operation of both the temperature sensing device 15 and the heater 13. Lag in the heater 13 causes a delay in reducing the error signal to zero and since the heater is energized during this period, the bath becomes overheated. Furthermore, when the error signal is reduced to zero and the heater is finally turned off, said heater, which has an appreciable heat capacity, continues to furnish heat to the bath, with the result that the temperature rises even more above the set point.

B. *Proportional control operation*

If hunting, or overheating and undercooling, as in on-and-off operation, is thought objectionable in any particular case, the present system can be set to operate as a proportional control regulator by turning the switch 63 to contact B. As seen from the drawing, this shorts out capacitor 73, but retains capacitor 67 in operation. Now, if the bath temperature again falls below the set-point, a positive alternating current error signal appears at the grid of tube 39 as before. However, the selector circuit 57 will, in this case, exert the following proportional control action. When the heater 13 is energized, the transformer 55 and associated rectifier 59 and filter units 71 and 69 will impress a D. C. voltage on the capacitor 67 of the polarity indicated. When this happens, capacitor 67 begins to charge through the resistor 65, causing a rising negative potential at the junction point 80. By properly selecting the values of the capacitor 37 and resistance 81, the time constant of this combination can be made small enough to permit the rising negative voltage capacitor 67 to be superimposed on the positive alternating error signal from the measuring bridge, thus opening the relay 53 and turning off the heater. However, as soon as the relay 53 opens, the transformer 55 and the selector circuit 57 are de-energized, and the negative voltage at point 80 starts to disappear, so that the relay closes again, energizing the heater and repeating the cycle, in a typical case, about once per second. This cycling continues and soon establishes what may be termed a duty-cycle, that is a cycle portion (or percent of a full cycle) during which the heater is energized, the heat received by the bath from the heater during this duty cycle matching the thermal losses of the bath. The exact value of the duty cycle depends on the heater capacity, as expressed in watts, as well as on the thermal losses of the bath. So long as the heater is cycling, the potential at point 80 will assume an average value proportional to the duty cycle or time percent of the full cycle during which the heater is energized. For example, if the duty cycle, or the period of energization of the heater, is 50% of the full on-and-off cycle, the average potential at point 80 will be 50% of the maximum instantaneous potential across condenser 71.

Whatever average negative potential is established at point 80 must be overcome by a positive alternating error signal from the bridge 17 to permit the thyratron 49 to fire. This means that if the duty cycle should increase, for example, because of increased thermal losses from the bath due to a decrease in the ambient temperature, the average negative potential at point 80 will also increase, which in turn can be overcome only by a stronger positive error signal from the bridge which naturally results from the temperature decrease in the bath. The action described is that of a proportional controller. Namely, an increase in the load, or in the heat demand of the bath, can occur only with, and in proportion to, a drop in the temperature of the bath. The proportional band of a controller may be defined as the number of degrees by which the bath temperature must change to cause the heater to change from operation at which it supplies no heat to operation at which it supplies its maximum heat or wattage. The drop in bath temperature due to increased load is frequently referred to as a droop. If a heater of specific wattage is used, and the proportional band is known, the controller gain may be expressed in terms of watts supplied to the heater per degree of bath temperature change.

C. *Proportional control with reset action*

Theoretically, proportional controllers can be built with extremely high gains. However, when using commercially available components parts in constant temperature systems, thermal lags put definite limitations on the usable gain of controller systems, and some temperature droop must be accepted not only with on-and-off, but also with proportional controller systems. As stated above, it is an object of this invention to eliminate the droop normally inherent in a proportional system by providing said system with a reset action. The reset action according to the present invention is exercized to reduce the error signal slowly to zero. A fast reset action would cause instability as in the case of an ordinary proportional controller having an excessive gain. In the present system, reset action is obtained by turning the switch to the open-circuit position C. This permits the capacitor 73 to charge through variable resistance 61 with the polarity indicated in Figure 1. Because the combination of the resistance 61 and capacitor 73 is selected so as to have a large time constant, capacitor 73 will charge only slowly to an average potential proportional to the duty cycle of the heater. However, for any given duty cycle value, the potential across capacitor 73 will ultimately cancel the potential across the capacitor 67, given a sufficient time. Thus, the positive error signal from the bridge 17 will no longer be needed to overcome the effect of the negative voltage from capacitor 67 on the grid of tube 39, when the system operates at a steady state. In other words, for a rapid change of load, proportional control with its droop and error signal still takes place, but at steady state the error signal is gradually reduced to zero. The reset time is adjustable by varying the value of the resistor 61, which may conveniently consist of a selector switch and a number of resistors so as to give discrete, reproducible resistance values.

From the previous, it is clear that the operation of the system according to either mode B or mode C depends on proper selection of time-constants of the two selector circuit branches, namely the branch comprising resistance 61 and capacitor 73, and the branch comprising resistance 65 and capacitor 67, the time constant of said first branch being greater than that of the second branch, and each of said time constants being much greater than that of the combination capacitor 37—resistance 81. As illustrative numerical examples the following values may be given to these elements:

Capacitor 37—about .007 microfarad
Capacitor 67—about 1.0 microfarad
Capacitor 73—about 4.00 microfarad
Resistance 61—from 1 to 25 megohms
Resistance 65—about 1.0 megohm
Resistance 81—about 5 megohms

We claim as our invention:

1. For use in a zone to be maintained at a constant temperature, a thermoregulator system comprising a heater for said zone energized from an A. C. source, a temperature sensing unit in said zone producing A. C. signals in response to temperature changes therein, a thyratron having its plate energized from said A. C. source, a cathode follower circuit having its input connected to receive the A. C. signals from the temperature sensing unit and its output connected directly to the grid of the thyratron, said thyratron firing when said signals are in phase with its plate voltage, relay means actuated by the firing of the thyratron to energize said heater, a selector circuit connected to the A. C. source in parallel with the heater, means comprising a rectifier and a capacitor for building up a D. C. potential across said selector circuit, said capacitor being connected to the cathode follower circuit to superimpose said potential on the signals being transmitted to the thyratron, thereby stopping the firing of the thyratron and deenergizing the heater.

2. For use in a zone to be maintained at a constant temperature, a thermoregulator system comprising a heater for said zone energized from an A. C. source, a temperature sensing unit in said zone producing A. C. signals in response to temperature change therein, a thyratron having its plate energized from said A. C. source, a cathode follower circuit, said cathode follower circuit comprising a thermionic tube, said tube having its grid connected to said temperature sensing unit and its cathode connected to the grid of said thyratron, and means for applying a high negative potential to the cathode return of said thermionic tube, thereby protecting the thyratron against anodic conduction during the warm-up period, said thyratron firing when said signals are in phase with its plate voltage, relay means actuated by the firing of the thyratron to energize said heater, a selector circuit connected to the A. C. source in parallel with the heater, means comprising a rectifier and a capacitor for building up a D. C. potential across said selector circuit, said capacitor being connected to the cathode follower circuit to superimpose said potential on the signals being transmitted to the thyratron, thereby stopping the firing of the thyratron and deenergizing the heater.

3. For use in a zone to be maintained at a constant temperature, a thermoregulator system comprising a heater for said zone energized from an A. C. source, a temperature sensing unit in said zone producing A. C. signals in response to temperature changes therein, a thyratron having its plate energized from said A. C. source, a cathode follower circuit having its input connected to receive the A. C. signals from the temperature sensing unit and its output connected to apply said signals to the grid of the thyratron, said thyratron firing when said signals are in phase with its plate voltage, relay means actuated by the firing of the thyratron to energize said heater, a selector circuit connected to the A. C. source in parallel with the heater, said selector circuit having two parallel branches, a capacitor connected across each of said branches, means comprising a rectifier in said selector circuit for charging said capacitors in opposition to each other to a D. C. potential at a rate dependent on the time constants of said branches, said capacitors being connected in series to the cathode follower circuit to superimpose the resulting potential on the A. C. signals being transmitted to the thyratron, thereby causing these A. C. signals to reduce to zero and thus stopping the firing of the thyratron and deenergizing the heater.

4. The system of claim 3, comprising selective switch means for grounding both said capacitors in one position and short circuiting one of said capacitors in another position.

References Cited in the file of this patent

UNITED STATES PATENTS

| | | |
|---|---|---|
| 2,383,456 | Coleman | Aug. 28, 1945 |
| 2,488,580 | Burleigh | Nov. 22, 1949 |
| 2,518,108 | York et al. | Aug. 8, 1950 |
| 2,522,753 | Drobisch | Sept. 19, 1950 |
| 2,724,040 | Mouzon | Nov. 15, 1955 |
| 2,761,052 | Knudsen | Aug. 28, 1956 |

OTHER REFERENCES

Scott: Electronic Engineering, vol. XXIV, No. 289, March 1952, page 117.